United States Patent [19]

Pao et al.

[11] 3,836,959

[45] Sept. 17, 1974

[54] APPARATUS FOR ACTIVATING REMOTELY LOCATED DEVICES IN RESPONSE TO ACOUSTICAL SIGNALS

[75] Inventors: John Pao, San Mateo; Raymond Wang, Santa Clara; Ben Tsutomu Takashima, San Jose; Chuck Y. Pon, San Francisco; Thomas T. Kanetake, Mountain View, all of Calif.

[73] Assignee: Pantex Corporation, San Mateo, Calif.

[22] Filed: Feb. 5, 1973

[21] Appl. No.: 329,569

[52] U.S. Cl. ......... 340/148, 340/171 R, 340/171 A, 340/168 R

[51] Int. Cl. ............................................ H04q 5/00

[58] Field of Search..... 179/2 A; 340/147 MD, 148, 340/171 R, 168 R

[56] References Cited

UNITED STATES PATENTS

| | | | |
|---|---|---|---|
| 2,600,648 | 6/1952 | Herrick | 340/147 MD |
| 3,532,822 | 10/1970 | O'Hanlon | 179/2 A |
| 3,647,971 | 3/1972 | Cushman | 179/2 A |
| 3,702,904 | 11/1972 | Bard | 179/2 A |

*Primary Examiner*—Harold I. Pitts
*Attorney, Agent, or Firm*—Jack M. Wiseman

[57] ABSTRACT

The disclosed embodiment of the present invention is a system which is responsive to the ringing tones of a telephone instrument for controlling the energization of one or more remote devices. The system includes a counter and decoder responsive to the ringing tones to provide a plurality of outputs each representing a particular number of sensed telephone rings. A pair of timers is actuated by the first ringing tone which is received when in their quiescent state; one of which has a shorter timing period than the other. A plurality of latches are each responsive to a respective output of the decoder. At the end of the first of the shorter timing periods, the particular decoder output which is high sets the corresponding latch, thereby storing the information representing the number of telephone ringing tones received during that timing period, which number of rings is controlled by the user at the calling station.

A programmable means, such as a plurality of switches, connects the outputs of the decoder to appropriate enabling gates of a second set of latches. These gates are enabled at the end of the second of the shorter timing periods and have, as a second input, an output of one of the first set of latches, such that one of the second set of latches is either set or reset when the correct number of rings is sensed in the first of the shorter timing periods and the correct number of rings is sensed in the second of the shorter timing periods. Each of the second set of latches controls a switching element to connect supply voltage to the corresponding remote device. Both timers reset the counter at the end of their timing period and the first set of latches is reset at the end of the longer timing period, such that the operation must be completed by the user and the information in the form of telephone ringing tones must be generated at the called station within this longer timing period.

4 Claims, 3 Drawing Figures

APPARATUS FOR ACTIVATING REMOTELY LOCATED DEVICES IN RESPONSE TO ACOUSTICAL SIGNALS

FIELD OF THE INVENTION

This invention relates generally to a code responsive device for activating certain control functions in response to a predetermined code, and more particularly to such a device which is responsive to the acoustic energy produced by the ringing of a called telephone station in a predetermined pattern to perform desired functions.

BACKGROUND OF THE INVENTION

A need exists for a relatively simple and inexpensive device for remotely controlling one or more output circuits. For example, it may be desirable to control the energization of a light in a residence from a considerable distance. Such a function and result is desirable when, for example, during vacation time or a prolonged absence from ones residence, certain lights in the residence can be activated and deactivated periodically to simulate the condition of someone being present.

Previous techniques for controlling the energization of a remote device include the use of radio transmitting equipment or the use of existing telephone equipment in which a connection is established between the calling station and a called station. These techniques, however, require a considerable amount of sophisticated equipment and are not always completely satisfactory to perform the intended functions for a number of reasons. For example, the use of radio transmitting equipment is limited in the distance from the source to the remote device and such equipment is relatively expensive. A direct connection to existing telephone equipment, on the other hand, is generally not permitted by its proprietor. In addition, the expense of leasing telephone lines is generally prohibitive.

Attempts have been made in the past to employ existing telephone equipment to control the energization of a remote device without directly connecting to the telephone equipment or existing telephone lines. This is accomplished by sensing the number of electromagnetic energy signals that is present at the called telephone station and actuating a remote device in response thereto. Such a system is activated by initiating a call at a calling station to ring a predetermined number of times before disconnecting or terminating the connection at the calling station. Such systems which are presently available, however, suffer from one or more disadvantages.

Many of the presently available systems for remotely controlling a device in response to the ringing of the telephone instrument are susceptible to being actuated unintentionally. Such systems are usually responsive to a predetermined number of rings in continuous sequence to perform the desired function. Any party other than the intended user attempting to place a call to the telephone station associated with such a system may accidentally activate the apparatus by permitting the telephone instrument to ring the required number of times.

Of those systems which are responsive to a predetermined sequence of ringing tones, none are presently known which are programmable to permit any desired combination of ringing tones to perform the desired function of actuating one or more remote devices. Other known systems are capable of actuating only one remote device and require an exact duplication of all its components to actuate additional devices.

Many of the previously known systems for remotely actuating a device in response to the ringing tones of a telephone instrument are not capable of deenergizing the remote device after it has once been activated. In addition, an inadvertent error by the user of such equipment, such as in the case of an incorrect number of ringing tones caused to be generated by the telephone instrument, cannot be easily corrected.

United States patents which may be of interest in connection with the present invention are as follows:

| | |
|---|---|
| Waldman | No. 3,049,592 |
| Bloxsom | No. 3,267,379 |
| Robbins | No. 2,363,145 |
| McNutt | No. 2,616,972 |
| Chaloupka | No. 3,374,987 |
| New et al. | No. 3,383,467 |
| Jahns et al. | No. 3,400,219 |
| Hoffman | No. 3,428,750 |
| Lovell | No. 3,484,553 |
| Walker | No. 3,485,952 |
| Stenhammar | No. 3,324,245 |
| Waldman et al. | No. 3,308,239 |
| Collyer et al. | No. 2,665,375 |
| Lenelson | No. 3,198,888 |
| Kunzelman et al. | No. 3,351,714 |
| Kolm | No. 3,360,777 |
| Chapman | No. 3,414,881 |
| Mitsui | No. 3,443,032 |
| Andersen | No. 3,513,443 |
| O'Hanlon | No. 3,532,822 |

A U.S. application of interest is an application filed by Martin Lee on Jan. 26, 1971, Ser. No. 110,520, for Apparatus For Activating A Remotely Located Device In Response To The Ringing Of A Called Telephone Subscriber Station now U.S. Pat. No. 3,783,193, issued on Jan. 1, 1974. The assignee of the present application is also the assignee of the aforesaid application.

SUMMARY OF THE INVENTION

It is an object of the present invention to provide an apparatus for activating a remotely located device in response to the ringing of a called telephone subscriber station which is not susceptible to being actuated by unintended conditions.

Another object of the present invention is to provide a remote control apparatus which is capable of controlling a plurality of remotely located devices.

Still another object of the present invention is to provide an apparatus for activating one or more remotely located devices in response to the ringing of a called telephone subscriber station in which the telephone rings must occur in a predetermined pattern and within a predetermined time limit.

A further object of the present invention is to provide such an apparatus which is capable of being easily programmable by the user to establish any desired code pattern for either activating or de-activating one or more of the remote devices.

Still a further object of the present invention is to provide such an apparatus in which a particular remotely located device can be activated by one code pattern of telephone rings and can be de-activated by another code pattern of telephone rings.

Yet a further object of the present invention is to provide such an apparatus in which a repeated correct code in the production of the particular code pattern of telephone rings at the called telephone subscriber station will not change the outcome of the operation at the called station.

The present invention accomplishes the above objects and overcomes the deficiencies of prior known apparatus intended to perform a similar function by providing a system which is responsive to a first set of ringing tones occurring within a particular time limit, wherein each set of ringing tones cannot exceed a predetermined number and the total time for transmission of all of the ringing tones cannot exceed still another time limit. The present invention satisfies these requirements by storing the information corresponding to the number of telephone ringing tones received within a first time period, if the number of those tones does not exceed a predetermined quantity. This stored information is employed in combination with information corresponding to the number of ringing tones received within a second time period to set one of a plurality of latches which control the energization of remote devices. A first timer is employed for establishing the above mentioned timing periods and a second timer is employed for establishing a total time within which all of the ringing tones must be produced at the called telephone subscriber station. If desired, a plurality of storage means may be employed, each being responsive to the number of ringing tones received during successive timing periods, such that the particular coded pattern of ringing tones required to activate the remote devices consists of more than two sets of ringing tones produced in succession. There is an endless number of codes or patterns that can be employed in the present invention. Toward this end, the number of rings can be varied from one to an infinitesimal number within a predetermined time period. Further, the extent of time intervals can also be varied over a wide range. Therefore, the different codes and patterns that can be generated for the operation is essentially unlimited.

These and other objects, features and advantages of the present invention will be more realized and understood from the following detailed description, when taken in conjunction with the accompanying drawings.

PREFERRED EMBODIMENTS OF THE INVENTION

Figure 1:
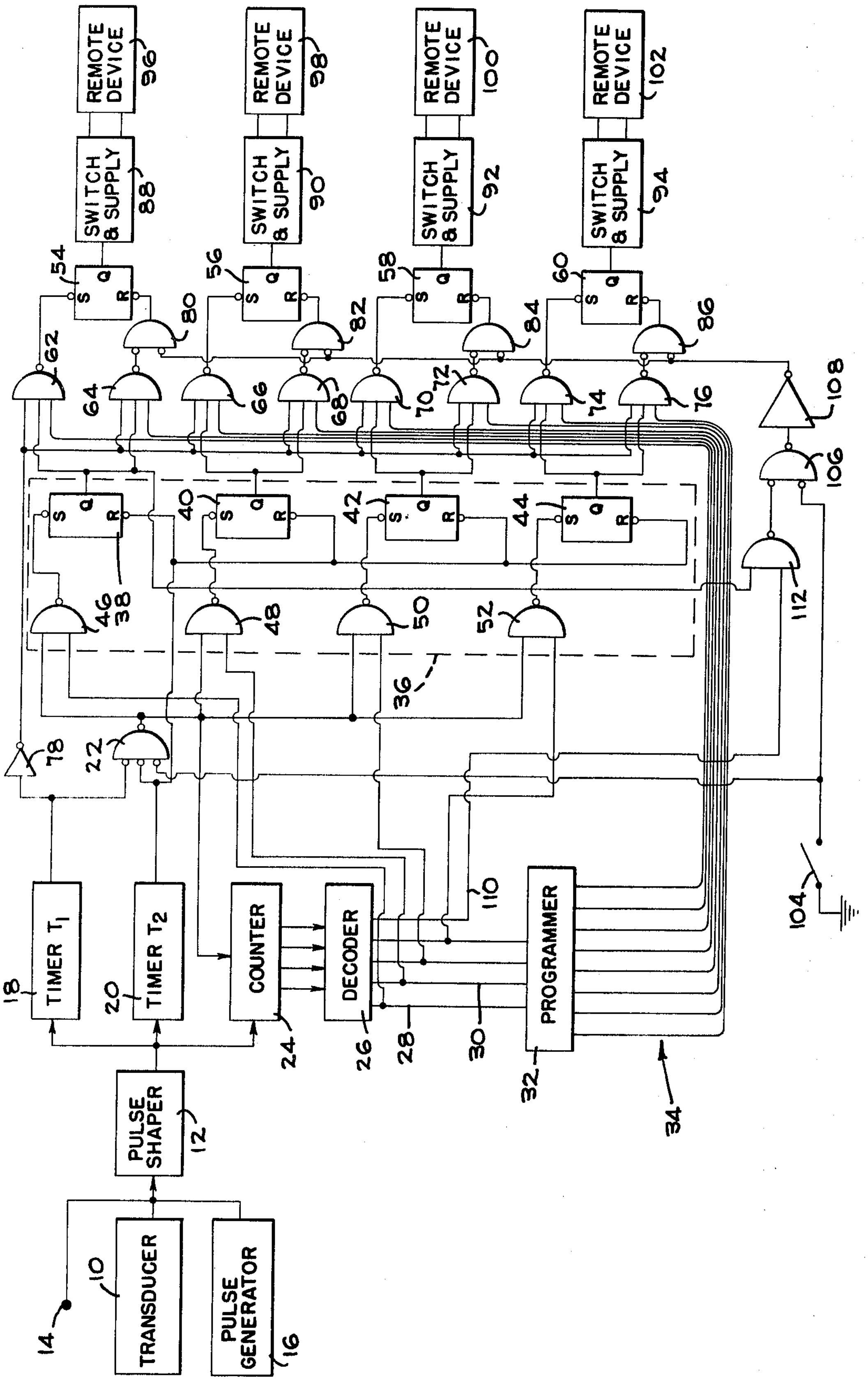
FIG. 1 is a partial block and partial logic diagram of one embodiment of the present invention.

Like reference numerals throughout the various views of the drawings are intended to designate the same or similar elements.

With reference to FIG. 1, there is shown, in block and logic diagram form, one embodiment of the present invention for activating a plurality of remotely located devices in response to ringing tones generated at a called telephone subscriber station by the user at the calling station. The apparatus of the present invention employs a transducer 10 which is located in close proximity to the telephone instrument at the called station and is responsive to the audio tones produced by the instrument to generate a corresponding electrical signal. The output of the transducer 10 is supplied to a pulse shaper 12 which generates a pulse for each ringing tone which is sensed by the transducer 10. Additional transducers can supply inputs by connection to a terminal 14 which is connected to the input of the pulse shaper 12. A pulse generator 16, which may be in the form of a momentary contact switch, is connected to the input of the pulse shaper 12 and is employed for testing the apparatus.

The first pulse produced at the output of the pulse shaper 12 is employed for actuating a pair of timers 18 and 20, each having a predetermined timing period at the end of which the negative going pulse of relatively short duration is produced at their respective outputs. The outputs of the timers 18 and 20 are supplied as two inputs to a NAND gate 22, the output of which is employed to reset a counter 24. Accordingly, whenever a negative going pulse is produced at the output of the timer 18 or a negative going pulse is produced at the output of the timer 20 at the end of their respective timing periods, the counter 24 is reset. The timing period of the timer 18 is shorter than the timing period of the timer 20 for reasons which will become apparent in the following description. In a preferred configuration of the present invention, the timing period of the timer 18 was set at 30 seconds and the timing period of the timer 20 was set at 3 minutes. The timing period of the timer 20 could be equal to or greater than the timing period of the timer 18. Preferably, the timing periods of the timers 18 and 20 are adjustable.

Pulses from the pulse shaper 12 are also supplied as an input to the counter 24 which provides an output in binary format corresponding to the number of pulses received. The outputs of the counter 24 are supplied to a decoder 26 which converts the binary representation of the number of pulses received into a decimal form at its outputs. Accordingly, only one output line from the decoder 26 will be high at any given time and the particular output line which is high indicates the number of pulses received by the counter 24. In a preferred arrangement, an output line 28 will be high whenever only one pulse is received at the input of the counter 24 and all other output lines from the decoder 26 will be low; an output line 30 will be high when two pulses have been received at the input of the counter 24; etc. The four output lines of the decoder 26 corresponding to 1, 2, 3, or 4 pulses received at the input of the counter 24 are connected through a programmer 32 to a plurality of output lines generally designated with the reference numeral 34. The programmer 32 is a manually programmable device, such as a plurality of switches, which will permit connection of any one input thereto to any one output therefrom.

The first four outputs of the decoder 26 are supplied to a storage section which is shown within a dotted line designated with the reference numeral 36. In addition, the output of the NAND gate 22 and the output of the timer 20 are supplied to the storage section 36. The storage section 36 contains a plurality of flip-flops or latches 38, 40, 42 and 44, each having its "set" input connected to the output of NAND gates 46, 48, 50 and 52 respectively. One input of each of the NAND gates 46, 48, 50 and 52 is connected to the output of the NAND gate 22 and the other input of each of these gates is connected to a respective output of the decoder 26. Accordingly, whenever an output is produced from the NAND gate 22, the gates 46, 48, 50 and 52 will be enabled. If, for example, the output line 28 of the decoder 26 is high, an output will be produced by the NAND gate 46 to set latch 38. Since only one output of the decoder 26 can be high at any given time, only one of the latches 38, 40, 42 and 44 can be set when an output is produced from the NAND gate 22.

Accordingly, it will be appreciated that at the end of the timing period of the timer 18 one of the latches 38, 40, 42 and 44 will be set depending upon which output of the decoder 26 is high. The "reset" input of each of the latches 38, 40, 42 and 44 is connected to an output of the timer 20 so that they will be reset upon expiration of the total time in which the operation is to be performed. The condition of the latches 38, 40, 42 and 44 will determine which one of a plurality of storage devices or latches 54, 56, 58 0r 60 will be set to activate the remote device.

As shown, the output of the latch 38 is connected to one input of NAND gate 62 and one input of a NAND gate 64. In a similar manner, the output of the latch 40 is connected to one input of a NAND gate 66 and one input of a NAND gate 68; the output of the latch 42 is connected to one input of a NAND gate 70 and one input of a NAND gate 72; and the output of the latch 44 is connected to one input of a NAND gate 74 and one input of a NAND gate 76. Outputs of the NAND gates 62, 66, 70 and 74 are connected to the "set" input of the latches 54, 56, 58 and 60, respectively. When all of the inputs to these NAND gates are high, the output is low, thereby setting the appropriate latch. A second input to each of the NAND gates 62 – 76 is supplied from an output of the timer 18 through an inverter 78. The third input to each of these NAND gates is derived from a corresponding output of the programmer 32. NAND gates 64, 68, 72 and 76 are connected through AND gates 80, 82, 84 and 86 to the "reset" input of the latches 54, 56, 58 and 60, respectively.

Figure 2:
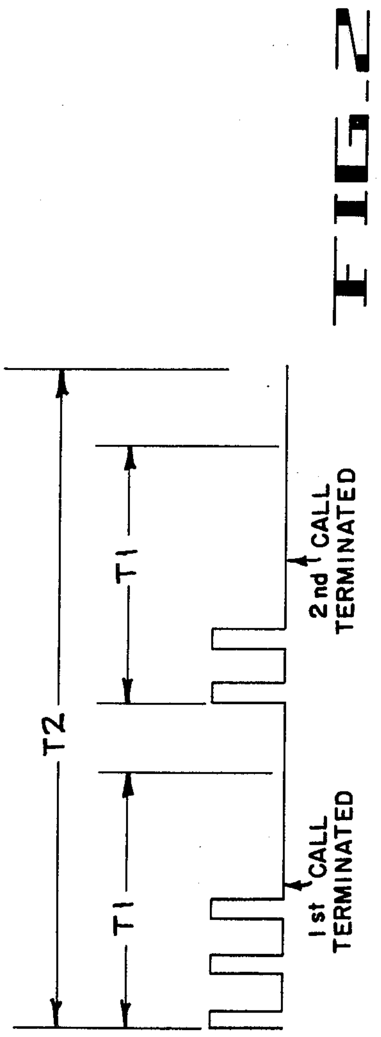
FIG. 2 is a graphic representation of one pattern of ringing tones at a called telephone station which will activate the apparatus illustrated in FIG. 1 to energize or de-energize one of the remote devices associated therewith.

If, for example, the programmer 32 is programmed to supply an output to the NAND gate 70 when two pulses have been received at an input of the counter 24 during the second timing period of the timer 18, then the latch 58 will be set if the output of the latch 42 is high and when an output is produced by the timer 18. This condition is illustrated graphically in FIG. 2 wherein the first set of pulses, consisting of two pulses, sets the latch at 58. Referring again to FIG. 1, the latch 42 will be set in this example at the end of the first timing period $T_1$ and the latch 58 will be set at the end of the second timing period $T_1$.

The outputs of the latches 54 – 60 are connected to switches 88, 90, 92 and 94, respectively, to close a circuit between a source of supply and a remote device 96, 98, 100 and 102, respectively.

If it is desired to deactivate a particular remote device, the corresponding latch 54 – 60 is reset by applying an appropriate signal to its "reset" input. If, for example, it is desired to disconnect the remote device 98, the latch 56 must be reset. If the programmer 32 has been manually programmed to provide an input to the NAND gate 68 corresponding to three pulses received at the input of the counter 24, the latch 56 will be reset when a pattern of ringing tones containing first two ringing tones and then three ringing tones is produced within the appropriate timing periods of the timer 18 and 20. Accordingly, if the user at the calling station causes the telephone instrument at the called station to generate two ringing tones, the latch 40 will be set at the end of the first timing period established by the timer 18. The user at the calling station then redials the called station and permits the instrument to generate an additional three ringing tones. If this is accomplished within the timing period established by the timer 20, then NAND gate 68 will provide an output to reset the latch 56, thereby deactivating a remote device 98.

A master reset switch 104 is provided for resetting the counter and latches 54 – 60. The switch 104, when momentarily closed, provides an input to a NAND gate 106, the output of which is supplied through an inverted 108 to a second input of each of the AND gates 80 – 86.

In addition, closure of the switch 104 supplies an input to the NAND gate 22 to reset the counter 24. If the user of the equipment is desirous of resetting the system from a calling station, it is only necessary to set the latch 38 during the first timing period of the timer 18, and to produce a high output on a line 110 from the decoder 26 during the second timing period of the timer 18. If, for example, the output line 110 will be rendered high when six input pulses are received at the input of the counter 24, the user at the calling station can dial the called station and permit the instrument to ring only once before disconnecting and then dial the call station a second time, but within the timing period of the timer 20, and permit the instrument to ring a total of six times. The subsequent resetting of all of the latches 54 – 60 is accomplished by connecting the output of the latch 38 and the output line 110 to respective inputs of a NAND gate 112. The output of the NAND gate 112 is connected through the NAND gate 106 and the inverter 108 to each of the AND gates 80 – 86.

Figure 3:
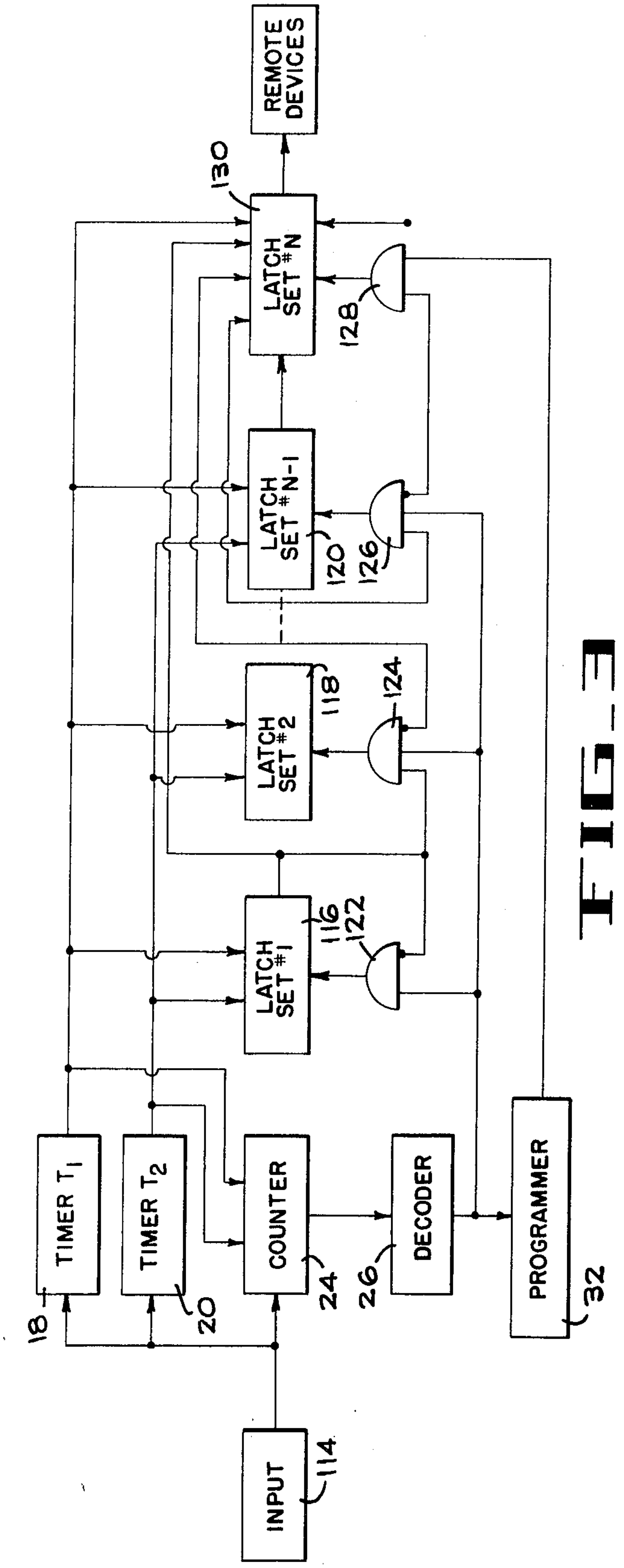
FIG. 3 is a partial block and partial logic diagram of another embodiment of the present invention which requires more than two successive sets of telephone ringing tones in succession to activate one or more remote devices.

It may be desirable to have such a system, such as that illustrated in FIG. 1, which is responsive to more than two sets of ringing tones. Such a system is illustrated in FIG. 3. As shown therein, an input 114 consisting of a transducer and pulse shaper supplies pulses to the timer 18, the timer 20, and the counter 24 in an arrangement identical to that shown in FIG. 1. The outputs of the timers 18 and 20 are connected to the counter 24 and the output of the counter 24 is connected to the decoder 26 which is, in turn, connected to the programmer 32. That portion of the system in FIG. 3 described to this point is identical to the corresponding part of the system illustrated in FIG. 1.

The outputs of the decoder 26, which are represented as a single line, are connected to a plurality of latches 116, 119 and 120 through gates 122, 124 and 126, respectively. Each of the latches 116, 118 and 120 are identical to the storage section 36 illustrated in FIG. 1. An output of the latch section 116 is connected to an input of the gate 122 to permit the outputs of the decoder 26 to be applied to the latch 116 when none of its outputs are high. In actual practice, each output of the latch section 116 would be connected to a corresponding gate having only one output of the decoder 26 connected thereto. However, for purposes of simplicity, only one output is shown from the latch section 116 and from the decoder 26, and only one gate is shown.

If one of the outputs of the latch section 116 is high, and if none of the outputs from the latch section 118 are high, the gate 124 is enabled to permit a corresponding output from the decoder 126 to be applied thereto. A similar arrangement is provided for the latch section 120. Accordingly, at the end of the first timing period of the timer 18, information will be stored in the latch section 116. During a second timing period of the timer 18, information will be stored in the latch section 118, etc. Following the transfer of information into the latch section 120, a gate 128 will be enabled which will supply information from the programmer 32 to a latch section 130 containing individual latches, such as the latches 54 – 60 illustrated in FIG. 1. The outputs of each of the latch sections 116, 118 and 120 are supplied to the latch section 130 and, if the correct information is stored in each, an appropriate latch will be set within the latch section 130 to energize a corresponding remote device.

It will be appreciated that a large number of variations are possible in the configuration of a particular system in accordance with the teachings of the present invention. Furthermore, it will be appreciated that a large number of different code patterns can be employed in accordance with the particular requirements of the user. There is an endless number of codes or patterns that can be employed in the present invention. Toward this end, the number of rings can be varied from one to an infinitesimal number within a predetermined time period. Further, the extent of time intervals can also be varied over a wide range. Therefore, the different codes and patterns that can be generated for the operation is essentially unlimited.

The present invention can be employed to control the energization of a large number of remote devices. Furthermore, the remote device may consist of a transmitter which, when energized, will transmit certain information to a receiver which will, in turn, control an output device.

We claim:

1. Apparatus for controlling the energization of a plurality of devices in response to a coded quantity of energy, comprising:

a. a transducer responsive to a coded quantity of energy to produce an electrical signal in pulse form corresponding thereto;

b. timing means responsive to the output of said transducer during each of the quiescent states of said timing means for initiating a plurality of timing periods and producing a plurality of output signals each corresponding to a respective ones of said timing periods;

c. counter-decoder means coupled to said transducer and said timing means for receiving said signal from said transducer and producing a plurality of output signals, each of said output signals of said counter-decoder means corresponding to the number of pulses contained in said signal produced by said transducer during each of said timing periods;

d. a plurality of first storage circuits responsive to the output of said counter-decoder means and the output of said timing means for storing information corresponding to the number of pulses contained in said signal produced by said transducer during a first one of said timing periods;

e. a plurality of second storage circuits responsive to the output of said counter-decoder means and to the output of said first storage circuits during a subsequent one of said timing periods for controlling selectively the energization of said devices; and f. programmable means connected between the output of said counter-decoder means and the input of said second storage circuits for enabling selective ones of said second storage device to be operative under the control of the output of said counter-decoder means and the output of said first storage circuits for controlling selectively the energization of said devices.

2. Apparatus as claimed in claim 1 wherein said counter-decoder means is reset by said timing means at the end of each of the respective timing periods.

3. Apparatus as claimed in claim 2 wherein the duration of the subsequent timing period is equal to the time duration of the first timing period.

4. Apparatus as claimed in claim 2 wherein the duration of the subsequent timing period is greater than the time duration of the first timing period.

* * * * *